Aug. 4, 1942.　　　I. L. CARTER ET AL　　　2,291,877
DISPLAY APPARATUS
Filed Aug. 28, 1939　　　2 Sheets-Sheet 1
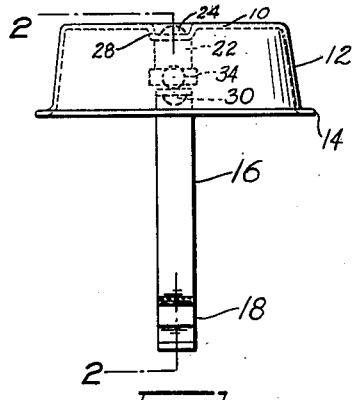
Fig. 1.
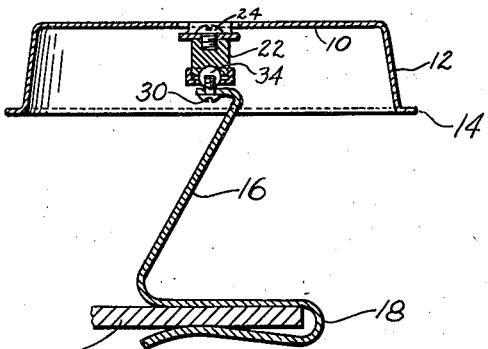
Fig. 2.
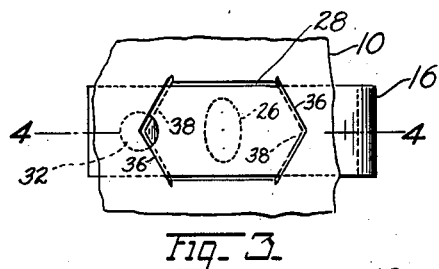
Fig. 3.
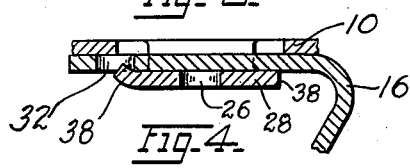
Fig. 4.
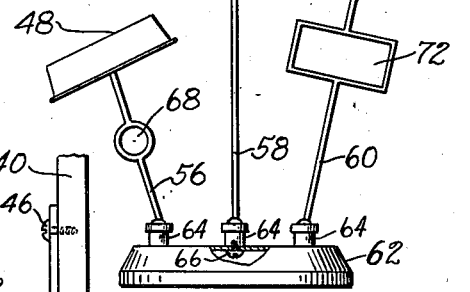
Fig. 6.
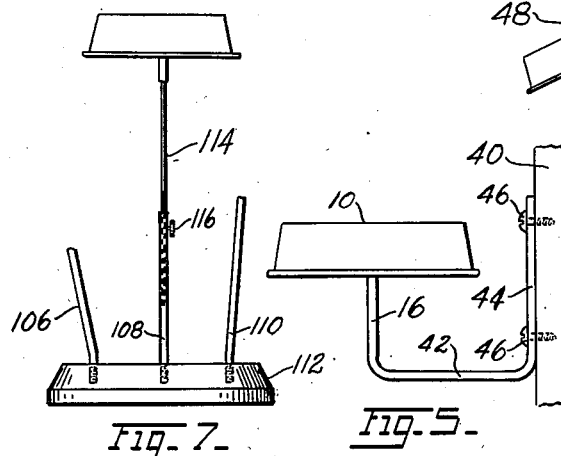
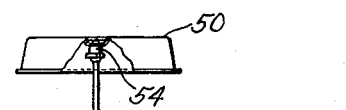
Fig. 5.
Fig. 7.
IVAN L. CARTER
GUY W. DAVIS
INVENTORS.
BY John E. Eastlack
ATTORNEY.

Aug. 4, 1942.   I. L. CARTER ET AL   2,291,877
DISPLAY APPARATUS
Filed Aug. 28, 1939    2 Sheets-Sheet 2

IVAN L. CARTER
GUY W. DAVIS
INVENTORS.

BY John E. Eastlack
ATTORNEY.

Patented Aug. 4, 1942

2,291,877

UNITED STATES PATENT OFFICE 2,291,877

DISPLAY APPARATUS

Ivan L. Carter and Guy W. Davis,
Los Angeles, Calif.

Application August 28, 1939, Serial No. 292,342

2 Claims. (Cl. 211—13)

This invention relates to improvements in display apparatus, and has for its principal object the provision of a very compact and portable device for window display and other purposes, which shall be new, useful, and economical, simple of construction, attractive in appearance, easy to assemble and disassemble, and of such design as to occupy a minimum of space when in use as well as when stored away due to non-use.

A further important object of the invention is to provide a device which shall have great value in the field of window display, and which shall at the same time be equally well adapted for household service as a wardrobe fixture or the like.

Another object of the invention is the provision of a wardrobe fixture or display device which shall have great flexibility of use, that is to say, an apparatus which shall be adapted to a wide variety of uses in various fields of display without necessitating duplicate fixtures or different types of display devices for each specific need.

A further object is the provision of a unitary device which shall serve to attractively display a large variety of different objects within a very limited display area so as to conserve window or other display space and without undue crowding of the articles displayed.

A still further object is the provision of an inexpensive, simply constructed device for display and other purposes, which shall be so constructed that the article or articles mounted thereon may be readily presented to view at any desired angle so that such articles may appear in their most natural fashion or with the utmost degree of attractiveness to the eye of a prospective purchaser.

Still another object is to provide a wardrobe fixture which will satisfactorily support headgear, particularly men's and women's hats or the like, which fixture may be set up in places ordinarily considered too small or too restricted for the accommodation of such articles.

A further object is to provide a portable, lightweight device of the general character hereinbefore referred to, which may be easily and quickly assembled and disassembled, being composed of a minimum of parts, and which shall consume very little space when set up as well as in unassembled form, and the various component parts of which device shall be interchangeable.

Other and further objects of the invention will be apparent from the disclosures in the accompanying drawings and following specification.

The invention, in a preferred form, is illustrated in the drawings and hereinafter more fully described.

In the drawings:

Figure 1 is a front elevation of one of the devices of this invention.

Figure 2 is a sectional view taken on the line 2—2 of Figure 1.

Figure 3 is a plan view of a modified form of the device shown in Figures 1 and 2.

Figure 4 is a sectional view taken on the line 4—4 of Figure 3.

Figure 5 is a side elevation illustrating a further modified form of the device shown in Figures 1, 2, 3, and 4.

Figure 6 is a front elevation of a combination display apparatus embodying the present invention, parts being broken away and other parts being shown in section for purposes of clarity.

Figure 7 is a front elevation of a slightly modified form of the apparatus shown in Figure 6.

As shown in the drawings:

Figure 8:
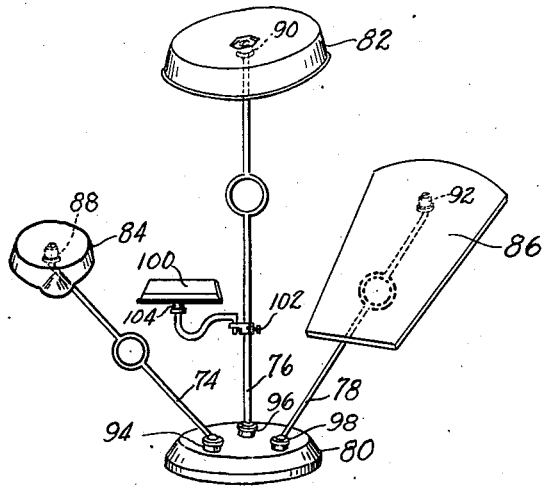
Figure 8 is a perspective view illustrating another form of combination display apparatus embodying this invention.

Referring to Figures 1 to 4, inclusive, the reference numeral 10 indicates generally a form of flat supporting table, preferably formed of metal, its flat surface being preferably elliptical, the edge thereof being turned downwardly to form an annular flange 12, which in turn is bent outwardly to form a secondary horizontally disposed annular flange 14. The table 10 just described is of a form particularly intended for supporting hats or similar objects, the flange 12 being straight in cross section and flared to conform with the inner face of the crown portion of a hat to support and keep in shape such crown portion, while the secondary flange 14 forms a stop whereupon the brim of the hat may rest.

The table 10 is securely but removably attached to a form of upright member or supporting pedestal 16 preferably flat in cross-section, the lower end of which may be bent into the shape of a spring clamp 18 whereby the same may be secured to and rigidly supported over the edge of a shelf or other flat element 20, as best shown in Figure 2. Obviously the same form of device is equally adaptable for attachment to other supporting objects, such as a vertically disposed door edge, by slightly modifying the shape of the member 16, and the table 10 may be of any other suitable shape for accommodation of other objects in form fitting relationship or otherwise, the particular shape heretofore described being merely illustrative of one mode of use of the invention.

Referring now to Figures 1 and 2, the table 10 is rendered rotatable and tiltable by the interpositioning of a ball-type swivel member 22 or the like between the members 10 and 16, the same being attached at its upper end to the table 10 by means of a screw 24 passing through a suitable opening 26 in the recessed portion 28 of the table 10 and thence into a suitably screw threaded opening in the upper flat face of the swivel member 22, the lower or ball portion of the swivel being attached to the member 16 by means of a second screw 30 passing upward through an opening 32 in the upper end of the pedestal member 16 and thence into the interiorly screw threaded opening provided in the swivel ball 34. Therefore the swivel joint 22 is readily removable in the event complete rigidity of the table 10 is desired, in which event the members 10 and 16 can be directly joined by some conventional means, such as one of the screws 24 or 30, which may then be tightened by means of a suitable nut or the like (not shown).

A method of accomplishing the latter result without the necessity of employing screws or other separate parts is shown in Figures 3 and 4, wherein the element 10 is recessed and cut at two opposite points along the bend to form a pair of slits 36, which are slightly wider than the element 16, the upper bent portion of the member 16 being simply inserted through the slits 36, thus providing for satisfactory supporting of the table 10 by the pedestal member 16.

However, in order to prevent accidental disconnection of the members 10 and 16 during handling while the device remains in set-up position, we have formed the slits 36 in V-shape to provide a pair of pointed tongues 38 in the depressed section of the recess 28. One of these tongues is adapted to slide into registration with the opening 32 in the member 16, whereupon moderate pressure applied against the tongue 38 from the under side will force said tongue to bend over and cause its point to move into the opening 32 in locking relationship (Figures 3 and 4), thus effectively preventing the two parts from slipping and becoming disconnected. When it is desired to again disconnect these parts, slight pressure applied against the bent tongue from above will again render the parts slidable and easy to take apart.

In Figure 5 the same type of device hereinbefore described is shown in slightly modified form, namely, as a fixture for more or less permanent installation against a supporting object 40, the lower portion of the support 16 being bent into the shape of a bracket 42 having a vertically disposed drilled end portion 44 whereby the same may be fastened to the object 40 by means of screws or the like 46. In this modification the table may obviously be joined to the member 16 by either of the methods shown in Figures 1 to 4, inclusive, depending on whether or not the tiltable feature is desired.

In Figure 6 a plurality of the supporting tables 48—50—52 similar to the table 10 are equipped with swivel joints 54 similar to the swivels 22, and are mounted upon and secured to upright members 56, 58, 60, the ends of which are exteriorly screw threaded and adapted to engage similarly threaded openings in the lower portion or ball of the upper swivels 54 in the same manner as the screw 30 of Figures 1 and 2, previously described. The lower threaded ends of the members 56, 58, 60 are secured to a base 62 in similar manner by means of inverted swivel joints 64, which are, in turn, secured to the base 62 by the screws 66, the swivels 64, of course, being preferably identical in every respect with the swivels 22 previously described. With this arrangement, the several tables may be adjusted at any angle desired with respect to each other. The base 62 is adapted to rest on a floor or the like whereby the entire device in accordance with this modification is self-supporting.

The base 62 is preferably partially hollowed out or otherwise recessed to provide easy access to its screw openings from below, so as to facilitate the assembling and disassembling processes.

It will be apparent that all three tables 48—50—52 shown in Figure 6 thus possess the tiltable feature, and that the interpositioning of the additional swivels 64 at the base 62 will provide a degree of flexibility which makes it possible for the operator to manipulate each of the upright members 56—58—60 at more than one point of adjustment to provide either straight or tilted positions, as desired, independent of the adjustment of the tables 48—50—52, so that the merchandise supported on the latter may be presented in the exact manner and at whatever angle the display artist deems appropriate. Owing to the swivels 64, the several upright members may be adjusted at any angle desired relative to each other and to the base.

Furthermore, the standards 56, 58, 60 may be furnished in different lengths, as shown in Figure 6, in order that the articles displayed may be positioned at different levels, which is sometimes desirable to effect more attractive display or to prevent overcrowding at any particular point, and these upright members or standards 56, 58, 60 may also be provided with ornamental openings 68, 70, 72, which may serve merely for decorative effect or perhaps for display of additional articles, or for any other use for which their shapes may be adapted.

As previously explained, the shape or contour of the table members 10, 48, 50, 52 may be varied throughout a wide range to suit specific uses so as to best accommodate and render most attractive the individual articles displayed. And because of the interchangeability of the parts it is thus possible to assemble a combination display device, such as, for example, that illustrated in Figure 8, wherein the display device is constructed with a plurality of standards 74—76—78 mounted upon a common base 80, and wherein each of the standards has mounted thereon an individually designed object supporting element or fixture, such as for instance a hat display form 82, a collar and tie display form 84, and a shirt-board 86, each of which may be positioned at a different level, if desired, by the use of standards of different lengths, and each standard directed at a different angle, as the situation requires, by adjustment of the upper swivels 88, 90, 92 and the lower swivels 94, 96, 98. Additionally, there may be provided a small swinging table or the like 100 for displaying small articles of accessories, which table may be removably and adjustably mounted on one of the standards 76 in any well known manner and the location thereof regulated by means of a thumb screw 102 or the like. This table 100 may also be tiltable by means of a swivel joint 104 similar to those previously described.

Figure 9:
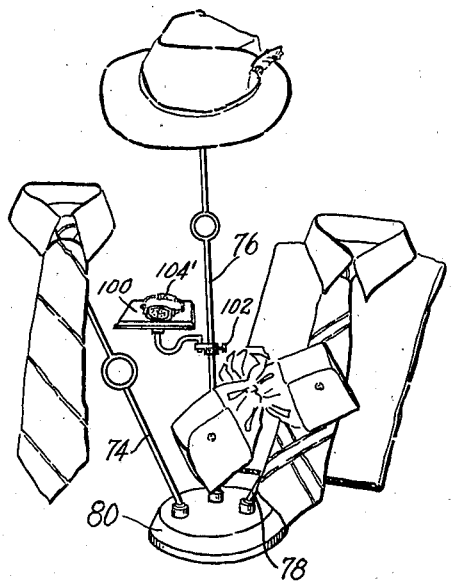
Figure 9 is a perspective view illustrating a typical use of the apparatus shown in Figure 8.

An example of the use of the foregoing combination unit is illustrated in Figure 9, wherein one standard supports a collar and tie, another supports a hat, and a third standard supports a shirt with tie, while the adjustable swinging table 100 displays an article of jewelry, 104', all displays harmoniously arranged in attractive fashion.

It will further be obvious that the swivel joints may be omitted from the base connection if desired, as shown in Figure 7, and the standards 106—108—110 threadably mounted directly in the base 112, thus providing for fixed and rigid positioning of the standards in the base.

Furthermore, the individual standards may, if desirable, be designed so as to be individually adjustable as to length, as illustrated in Figure 7, by forming the same of a combination of collapsible or telescoping elements as shown at 108—114, and regulated by a thumb screw or the like 116.

We have thus provided in a single display apparatus, a series of interchangeable elements which may be furnished the user in kit form in any combination desired, and which permits the operator to create and execute innumerable forms of distinctive displays even in very restricted space without the necessity of employing other extra types of equipment.

Furthermore, the types of tiltable fixtures illustrated in Figures 1 to 5, inclusive, allow for a maximum display of hats or similar articles on a small shelf or the like, as by their use hats may be displayed in positions almost equivalent to their standing on end, and many arranged side by side on a tier of pedestals along a shelf with the tables 10 tilted so that the objects supported are arranged uniformly in a given direction.

We claim:

1. A collapsible portable display fixture comprising in combination, a relatively narrow horizontally disposed base element adapted to loosely occupy a restricted area of flat display space, a plurality of elongated standards attached directly to said base, and a merchandise display top pivotally attached to the top of each standard, each of said standards being independently pivoted upon the base and adapted to be swung radially of the base in a relatively wide arc into temporary fixed angular adjustment relative to the base and relative to the other standards attached to the said base, whereby numerous articles of merchandise of varying shapes and dimensions may be supported in various positions and at various angles and levels relatively remote from the base and from other displayed material so as to avoid crowding of displayed merchandise and present a clear and unobstructed view thereof.

2. A collapsible portable display fixture comprising in combination, a relatively narrow horizontally disposed base element adapted to loosely occupy a restricted area of flat display space, a plurality of elongated standards of varying lengths attached directly to said base, and a merchandise display top pivotally attached to the top of each standard, each of said standards being independently pivoted upon the base and adapted to be swung radially of the base in a relatively wide arc into temporary fixed angular adjustment relative to the base and relative to the other standards attached to the said base, whereby numerous aricles of merchandise of varying shapes and dimensions may be supported in various positions and at various angles and levels relatively remote from the base and from other displayed material so as to avoid crowding of displayed merchandise and present a clear and unobstructed view thereof.

IVAN L. CARTER.
GUY W. DAVIS.